June 5, 1928.
F. H. McCORMICK
ELECTRIC OVEN
Filed Oct. 18, 1926
1,672,724
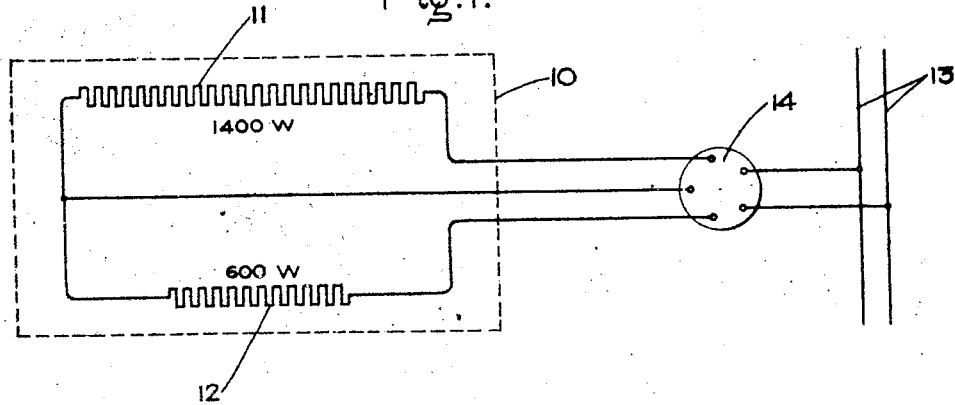
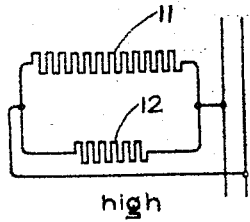
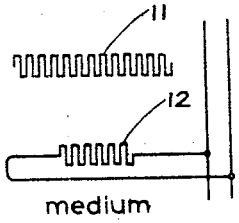
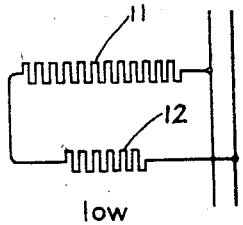
Inventor:
Francis H. McCormick,
by
His Attorney.

Patented June 5, 1928.

1,672,724

UNITED STATES PATENT OFFICE.

FRANCIS H. McCORMICK, OF GLEN ELLYN, ILLINOIS, ASSIGNOR TO EDISON ELECTRIC APPLIANCE COMPANY, OF CHICAGO, ILLINOIS, A CORPORATION OF NEW YORK.

ELECTRIC OVEN.

Application filed October 18, 1926. Serial No. 142,253.

My invention relates to electric ovens and has for its object the provision of simple, reliable and efficient heating means for the oven.

More specifically, my invention relates to an improved organization and arrangement of the heating units in an electric oven whereby the control of the oven is greatly simplified. It has heretofore been customary in the construction of electric ovens to provide a heating unit in the top of the oven and another heating unit in the bottom of the oven, these units being each divided into sections which are controlled by means of a suitable switch whereby the sections of each unit may be connected in series or in parallel to give different rates of heat generation.

In carrying out my invention, I provide heating units in the top and bottom of the oven which are arranged to be controlled from a single switch and yet avoid the limitation heretofore characteristic of single switch control. In one embodiment of my invention I provide a heating unit in the top of the oven which dissipates substantially more heat than the unit in the bottom of the oven and connect the two units to a three heat switch whereby they are connected in parallel to give a rapid rate of heating when the oven is being preheated, the bottom unit is operated alone for the usual high temperature baking and roasting operations, and the two units are connected in series for lower temperature cooking operations.

For a more complete understanding of my invention, reference should be had to the accompanying drawing in which Fig. 1 is a diagrammatic view of an electric oven embodying my invention, while Figs. 2, 3 and 4 are diagrams showing the various electrical connections for the heating units.

Referring to the drawing, I have shown my invention in one form as applied to an oven 10 of any well known form, such, for example, as provided on electric ranges for boiling and baking. In one embodiment of my invention I provide two electric heating units in the oven, a heating unit 11 in the top of the oven, and a heating unit 12 in the bottom. These heating units are both of the well known resistor type consisting of a resistance heating conductor made of suitable metal, such as a nickel-chromium alloy. The upper heating unit 11 is of much higher wattage, or dissipates more heat than the lower unit. The two units are so proportioned that when connected in parallel to a suitable electrical supply source 13 a rapid rate of heating will be obtained, whereby the oven may be heated quickly, or the intense heat from the upper unit used alone for broiling meats, etc. The lower unit will be of such size as to maintain the usual baking temperature of approximately 400° F. when connected alone to the supply source, and the two units will further be so proportioned that when they are connected in series across the supply source the oven will be maintained at a suitable temperature for low temperature baking and for boiling operations. A single three-heat switch 14 of any suitable construction is provided for controlling the connections of the two heating units in the manner indicated. The electrical connections of the two heating units, as previously described, are shown in Figs. 2, 3 and 4 for the high, medium and low heats respectively.

The sizes of the heating units will, of course, vary with the size and character of the oven. For an oven requiring 2000 watts energy input for quick heating, I have found that very satisfactory results may be obtained with an upper heating unit of 1400 watts capacity and a lower heating unit of 600 watts capacity. It will be observed that with these two units connected in parallel, as shown in Fig. 2, the energy input will be 2000 watts for quick heating. With the lower heating unit connected alone, as indicated in Fig. 3, the input will be 600 watts which in the oven under consideration maintained a very satisfactory baking temperature. When the two units are connected in series, as indicated in Fig. 4, the energy input will be 420 watts total, 295 watts being taken by the lower unit and 125 by the upper unit, which gives a very satisfactory temperature and heat distribution for lower temperature baking and boiling.

It will be observed that this control means for an electric oven is very simple, both in construction and operation, since the control is effected entirely from a single switch.

While I have described my invention as embodied in concrete form and as operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. The combination with an oven of electric heating means therefor comprising heating units in the top and bottom of said oven, one of said heating units being arranged to maintain a desired baking temperature and the other heating unit having at least twice the heat capacity of the first, an electrical supply source for said heating units, and means for connecting both of said heating units to said supply source for preheating the oven and for connecting the first heating unit alone for normal operation.

2. The combination with an oven of electric heating means therefor comprising a heating unit in the bottom of the oven adapted to maintain a desired baking temperature, a heating unit of high heat capacity in the top of the oven, an electrical supply source, and means for connecting both of said heating units to said supply source for preheating the oven, for connecting said bottom heating unit alone for normal operation, and for connecting both of said heating units in series for operation at a lower temperature.

3. The combination with an oven, of electric heating means therefor comprising a heating unit in the bottom of the oven arranged to maintain a desired baking temperature, and a heating unit in the top of the oven arranged to supply a relatively large amount of heat when connected in parallel with the lower unit, whereby the oven may be heated rapidly, and to maintain a desired lower operating temperature when connected in series with said bottom unit.

4. The combination in an electric oven, of a heating unit in the bottom of the oven arranged to maintain a desired cooking temperature after the oven has been heated to that temperature, a heating unit in the top of the oven of relatively large heat capacity, an electric supply source, and switching means for connecting said units in parallel to said supply source whereby the oven is heated rapidly to a desired temperature, for disconnecting the upper unit whereby the temperature is maintained by the lower unit only, and for connecting said units in series to maintain a lower cooking temperature.

5. The combination in an electric oven, of a heating unit in the bottom of said oven arranged to maintain a desired baking temperature, a heating unit in the top of the oven arranged to supply a relatively large amount of heat, an electrical supply source, and a single switching means for controlling the connections of said units to said source, whereby the two units may be connected in parallel for preheating the oven, the bottom heating unit connected alone for high temperature cooking operations, and the two units connected in series for low temperature cooking operations.

In witness whereof, I have hereunto set my hand this 14th day of October, 1926.

FRANCIS H. McCORMICK.